Patented Oct. 29, 1935

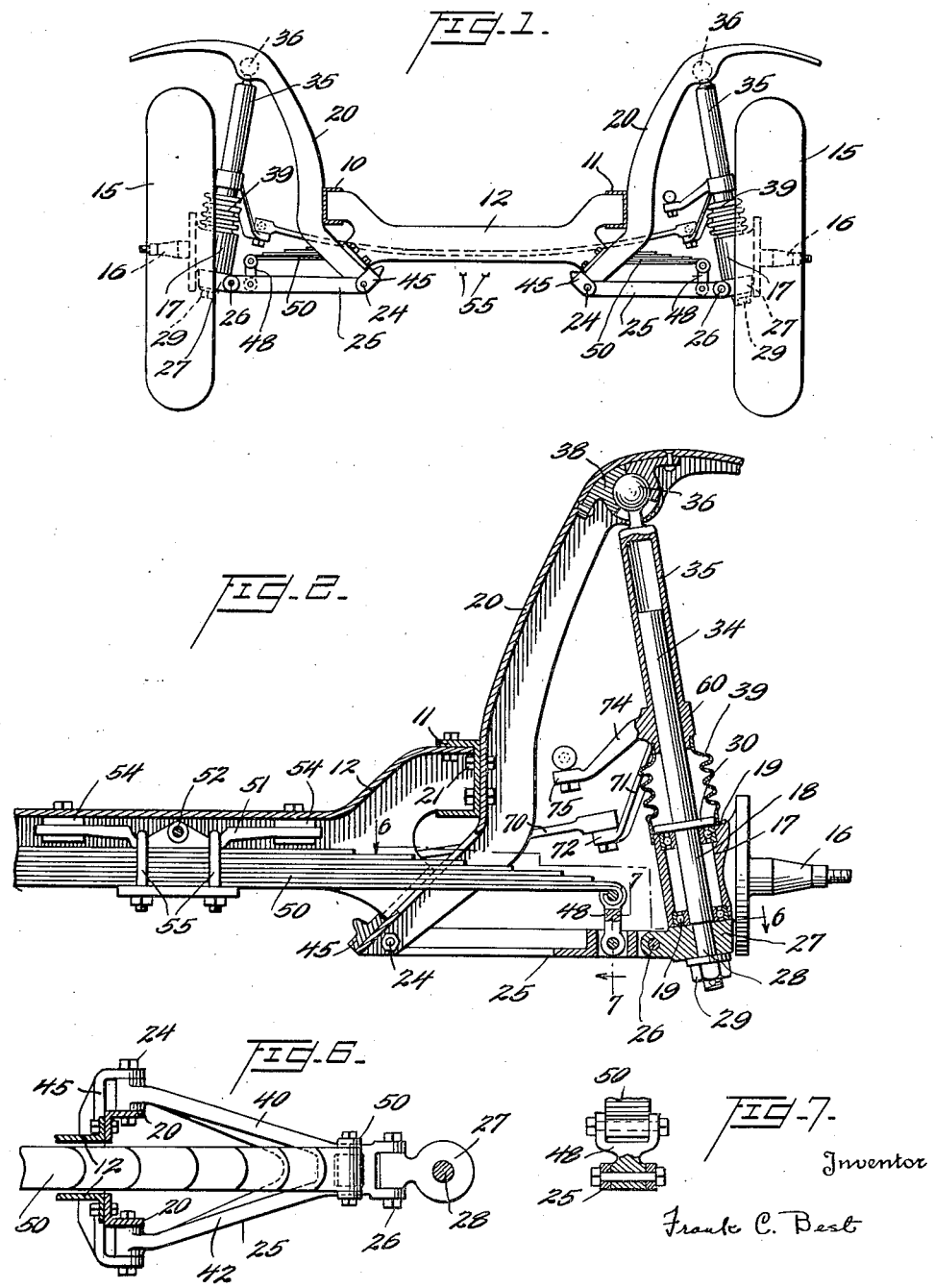

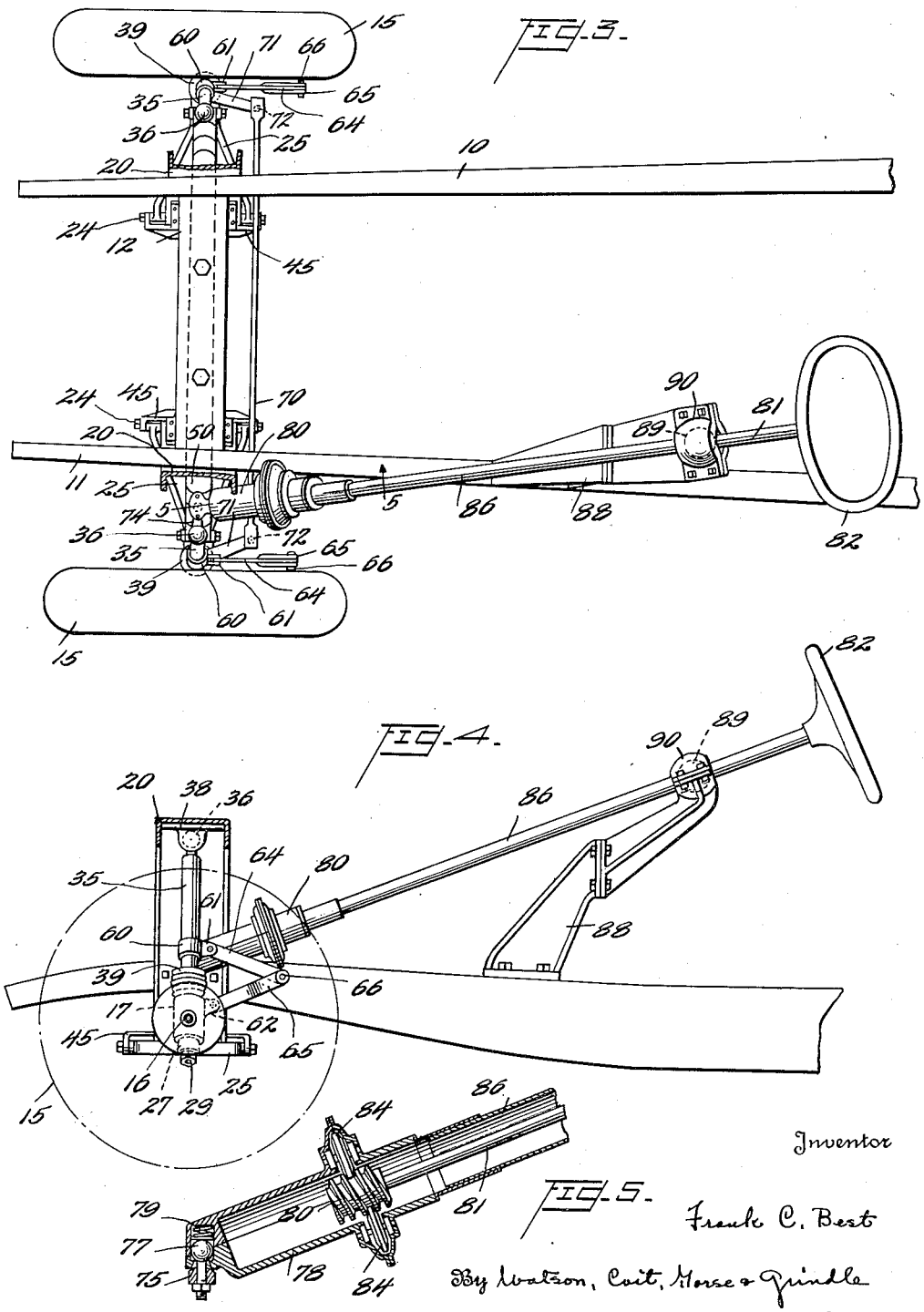

2,018,653

UNITED STATES PATENT OFFICE 2,018,653

MOTOR VEHICLE

Frank C. Best, Detroit, Mich., assignor to Packard Motor Car Company, Detroit, Mich., a corporation of Michigan Application November 27, 1933, Serial No. 699,968

18 Claims. (Cl. 280—96.2)

This invention relates to motor vehicles and more particularly to improvements in vehicles of the type in which the road wheels are independently sprung from the vehicle frame. It is the principal object of the invention to provide a wheel suspension which will improve the riding characteristics of the vehicle under different road conditions and which will render steering control more positive and less difficult.

It is a feature of the invention that the wheel tread is not materially altered as the wheels rise and fall with respect to the frame in passing over an uneven road bed, and thus the unnecessary wear and scuffing of the tires which is quite serious in many forms of independent wheel suspension is avoided.

It is a further object of the invention to provide an independent wheel suspension which is sturdy and compact in construction and which, when applied to the steerable road wheels of a vehicle, may be employed in connection with steering mechanism of the conventional type without causing undesired steering movement of the wheels as the latter rise and fall.

In the preferred form of the invention the conventional steering mechanism is replaced by a simplified form of steering control particularly adapted to the form of wheel suspension disclosed whereby the number of moving parts and hinged joints is materially reduced and steering control of the vehicle rendered easier. Thus the steering mechanism and the wheel suspension function as a whole to prevent transmission of shock from the road wheels to the usual steering hand wheel, and defective steering operation frequently resulting in the development of shimmy is effectively avoided.

Further objects and features of the invention will be apparent from the following description taken in connection with the accompanying drawings, in which:

Figure 1 is a front elevation of a vehicle chassis illustrating the manner in which the invention may be applied thereto;

Figure 2 is an enlarged transverse sectional view of the arrangement showing the construction at one side of the vehicle;

Figure 3 is a plan view of a portion of a vehicle frame illustrating the application of one form of steering mechanism to the wheel suspension shown in Figures 1 and 2;

Figure 4 is a side elevation of the construction shown in Figure 3;

Figure 5 is a section taken substantially on the line 5—5 of Figure 3;

Figure 6 is a section on the line 6—6 of Figure 2; and

Figure 7 is a fragmentary sectional view on the line 7—7 of Figure 2.

In describing the invention, reference will be made to the drawings in which the invention has been illustrated as applied to a suspension for the front steerable road wheels of a vehicle. It will nevertheless be understood that certain features of the wheel suspension are equally as applicable to the rear road wheels and to wheels which are not steerable. It will furthermore be appreciated from the following description of the invention that while the various elements disclosed in the drawings are referred to by specific language in order to facilitate an understanding of the principles of the invention, no limitation of the invention is thereby intended, various alterations of the structural details such as fall within the scope of the invention being contemplated.

Referring first to Figures 1 and 2 of the drawings it will be observed that the supporting frame of the vehicle is illustrated conventionally as comprising the side frame members 10 and 11 and the cross frame member 12, the latter extending between and being rigidly secured to the side frame members in the usual manner. The road wheels 15 are carried on wheel spindles 16 which are in turn rigid with steering knuckles 17, each of the steering knuckles being supported for rising and falling movement as well as for steering movement in a substantially horizontal plane. Thus each knuckle may be supported on a shaft 18, preferably by anti-friction bearings 19, the shaft 18 performing the function of the usual king pin. For convenience the axis about which the road wheels are swung to effect steering of the vehicle is hereinafter described as substantially vertical; it will nevertheless be understood that the shaft 18 will ordinarily be inclined to the vertical, this being necessary to provide the usual wheel camber and to properly control the movement of the wheels in rising and falling as will be explained.

It will also be convenient in describing the invention to refer to the wheel suspension structure at one side of the vehicle only, it being appreciated that the structures at opposite sides of the vehicle are similar except where otherwise indicated. Thus each side frame member 10 carries a fender brace 20, bolted or otherwise secured to the frame as at 21, the brace 20 depending beneath the side frame member to afford a pivotal support as at 24 for the wheel supporting link 25, the latter being also pivotally connected as at 26 to a sleeve 27 surrounding a reduced portion 28 of the shaft 18, the sleeve being retained in position by means of a nut 29 threaded on the lower end of the shaft. The shaft 18 is provided with an annular flange or collar 30 engaging the uppermost of the anti-friction bearings 19 and the sleeve 27 engages the lower bearing 19, thus confining the shaft 18 within the knuckle against endwise displacement but permitting free rotation of the knuckle on the shaft.

The upper portion 34 of the shaft 18 is substantially cylindrical and is telescoped within a cylindrical sleeve 35, the latter being formed at its upper end to afford a universal connection with the fender brace 20, this connection preferably comprising a spherical head 36 which is received within a complementary split socket 38, the latter being secured to the fender brace 20. During operation of the vehicle the shaft 18 and the sleeve 35 partake of relative sliding movement and it is therefore desirable to supply lubricant to these parts, an extensible boot 39 of flexible material surrounding the exposed portion of the shaft 18 and being secured to the lower end of the sleeve 35 and to the knuckle 17. It will be understood that while the shaft 18 actually slides within the sleeve 35 in the illustrated form of the invention, the use of the term "sliding movement" does not preclude the employment of anti-friction devices between these parts.

The construction of the lever 25 is more clearly shown in Figure 6 of the drawings, this lever being formed with inwardly divergent arms 40 and 42 which are supported for pivotal movement about the common axis 24. A yoke-shaped reinforcing member 45 extends about the brace 20 and the inner ends of the arms 40 and 42 to add strength to the construction, the bolts 24 passing through the member 45, the side flanges of the brace 20, and the arms 40 and 42 respectively. Thus longitudinal and rotative stresses such as occur when the brakes are applied are effectively carried from the road wheel to the vehicle frame.

The movement executed by the road wheel in passing over an irregular bed will now be apparent. As either road wheel rises, the portion 34 of the associated shaft 18 will move upwardly within the complementary sleeve 35 and the lower end of the shaft 18 will be guided during this movement by the link 25 which is pivotally connected at its opposite ends to the vehicle frame and to the road wheel assembly respectively. It will be observed that in the normal position occupied by the several parts of the wheel suspension, in which they are shown in Figures 1 and 2, the link 25 is nearly perpendicular to the shaft 18, the point of pivotal connection 26 between the link and the sleeve 27 being slightly below a line passing through the pivotal axis 24 and lying at a right angle to the shaft 18. Thus the lower end of the shaft 18 and the associated steering knuckle will be displaced laterally of the frame to a very slight extent only as the road wheel rises and falls and the shaft 18 and the associated sleeve 35 will therefore partake of swinging movement of relatively small amplitude about the spherical connection 36, 38, there being no material variation of the camber of the wheel. Again, as the wheel rises, the link 25 will approach a position perpendicular to the shaft 18 and thus the latter tends to move outwardly to a small extent, this outward movement of the wheel and the very small change in camber which it produces compensating for the inward movement of the wheel resulting from the inclination of the shaft 18, the net result being that there is no appreciable variation in the tread of the road wheels and unnecessary wear on the tire is consequently avoided.

The upward movement of either road wheel is resisted by a transversely extending leaf spring 50 which is carried by the cross frame member 12 adjacent the mid point of the latter. Each end of the leaf spring 50 is connected by means of a shackle member 48 to the associated wheel supporting link 25 as shown more particularly in Figure 7, it being observed that this connection permits slight relative longitudinal displacement of the spring and the link.

The connection between the leaf spring 50 and the frame is preferably of such a nature as to prevent the transmission of synchronous vibrations between the wheels or between either wheel and the frame through the spring and may comprise a lever 51 pivoted as at 52 to the cross frame member for slight rocking movement about the longitudinal axis. The two arms of the lever 51 are yieldingly connected to the frame through rubber blocks 54. The usual shackle bolts 55 secure the spring to the lever 51, and it will thus be observed that any vibration induced in the spring such as would promote a rocking movement of the lever 51 is effectually damped by the resultant compression and expansion of the rubber blocks, the energy of vibration being dissipated in the form of heat. The damping of synchronous vibrations in this manner tends to eliminate shimmy in the wheels.

Referring now to Figure 4 of the drawings, it will be observed that the sleeve 35 is provided adjacent its lower end with a collar 60 from which an ear 61 extends rearwardly, a rearwardly extending ear 62 being also formed on the steering knuckle 17. Links 64 and 65, pivoted to each other at 66 and to the ears 61 and 62 respectively serve to connect the sleeve 35 and the knuckle 17 for unitary rotation, at the same time permitting the sleeve 35 and the knuckle 17 free relative movement in an axial direction. It will be observed that this construction is the equivalent of a keyed connection between the portion 34 of the shaft and the sleeve 35 but is somewhat simpler, sturdier, and more readily accessible for repair.

The sleeves 35 at opposite sides of the vehicle are connected by means of a cross tie rod 70, the latter being pivotally connected at its ends as at 72 in the conventional manner to steering knuckle arms 71 formed integrally with or secured to each of the sleeves 35. The sleeve 35 at the left-hand side of the vehicle is provided with a further arm 74 which is operable either by the conventional steering drag link or by steering mechanism about to be described and illustrated more particularly in Figures 3 to 5 inclusive of the drawings.

It will be apparent that the arm 74 may be rotated about the axis of the shaft 18, the end 75 of this arm moving forwardly and rearwardly in a substantially horizontal plane. When the arm 74 is thus moved, and the sleeve 35 rotated, the steering knuckle 17 is similarly rotated through the links 64 and 65 and the associated road wheel is caused to execute a steering movement. A similar steering movement is executed by the road wheel at the right-hand side of the vehicle by reason of the connection between the two road wheel assemblies comprising the cross tie rod 70 and the arms 71.

As hereinbefore explained, the component of movement laterally of the vehicle of which the shaft 18 and the sleeve 35 partake as the associated road wheel rises and falls is extremely slight and thus no undesired steering movement of the wheels takes place as the result of the steering connections between the wheels. The tendency of the wheels to shimmy on passing over a rough road bed is thereby materially reduced or eliminated. It will be particularly observed that there is no rising and falling movement of either of the arms 71 and 74 since the sleeve 35 does not rise and fall with the road wheel. For this reason it is possible to employ the simplified form of steering mechanism illustrated in Figures 3, 4, and 5 of the drawings.

Thus a universal joint connection of conventional type may be employed between the inner end 75 of the arm 74 and a steering member 78, this connection being indicated at 77 in Figure 5, a coil spring 79 acting between the relatively movable parts of the connection to prevent rattling. The member 78 constitutes in effect the nut of a screw and nut gearing, the associated threaded member 80 being carried by the lower end of the steering column 81, the usual steering hand wheel 82 being secured to the upper end of this column. In order to reduce friction in the gearing, the member 78 is formed as a housing to receive the threaded member 80 and is provided with a plurality of rollers 84, the periphery of these rollers engaging in the threads of the member 80 and being journalled for rotation in the member 78 about axes slightly inclined with respect to the axis of the member 80 in the direction of the threads. It will be understood that each of the rollers 84 is bevelled adjacent its periphery so as to mesh with a fair degree of accuracy with the threaded portion of the member 80 so that backlash in the gearing may be substantially eliminated and friction minimized. The usual steering housing 86 surrounds the steering column 81 and extends between the hand wheel 82 and the member 78 to completely enclose the steering column and the gearing, the latter being packed with lubricant as is customary. A bracket 88 is formed at its upper end to receive a substantially spherical collar 89 fitted on the steering housing 86, the assembly being completed by means of a cap 90 secured to the bracket at its upper end, whereby a spherical joint is effected between the vehicle frame and the steering housing, permitting the latter to rock but retaining the same against longitudinal displacement.

As the steering hand wheel 82 is rotated, the member 78 which forms the nut of the screw and nut gearing hereinbefore referred to will be moved generally longitudinally of the vehicle, thus rocking the arm 74 and effecting steering movement of the road wheels as hereinbefore explained. Owing to the fact that the end 75 of the arm 74 does not move in a path precisely longitudinally of the steering column, some slight rocking movement of the latter must be permitted. The ball and socket joint between the steering housing 86 and the bracket 88 is provided for this purpose.

It will be appreciated that the link 25 and the shaft 18 constitute in effect a pair of links, one having a simple pivotal connection with the frame and the other having a combined pivotal and sliding connection with the frame, the wheel assembly including the steering knuckle 17 being carried by the latter. When the structure is considered from this standpoint, various alterations of the illustrated embodiment of the invention will suggest themselves and all such alterations as fall within the spirit and scope of the appended claims are contemplated.

Having thus described the invention, what is claimed as new and desired to be secured by Letters Patent is:

1. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means pivotally connected with said frame and having a sliding connection with said member for guiding the latter in a predetermined path as the road wheel rises and falls, and mechanism associated with said wheel assembly and acting through said means to effect steering movement of said road wheel assembly.

2. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means pivotally connected with said frame at a point disposed above the member and having a sliding connection with the latter to guide the same in a predetermined path, and mechanism acting through said means to impart steering movement to said wheel assembly.

3. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means pivotally connected with said frame at a point disposed above the member and having a sliding connection with the latter to guide the same in a predetermined path, and mechanism acting through said means to impart steering movement to said wheel assembly, said mechanism including a non-rotatable connection between said means and said wheel assembly, and apparatus associated with said means for rotating the latter.

4. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means carried by said frame and operatively connected with said member to guide the latter in a path inclined slightly with respect to the vertical, a non-rotative connection between said means and said member, and steering apparatus for rotating said means.

5. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means carried by said frame and operatively connected with said member to guide the latter in a path inclined slightly with respect to the vertical, said means comprising an element having a ball and socket connection with said frame and a slidable non-rotative connection with said member.

6. In a motor vehicle, the combination with a vehicle frame, of a steerable road wheel, a steering knuckle carrying said road wheel, a king pin supporting said knuckle for steering movement, a link pivotally connected to said frame and to said knuckle on substantially horizontal axes, an element pivoted to said frame above said king pin and having a sliding connection with the latter, and means acting through said element for swinging said knuckle on said king pin.

7. In a motor vehicle, the combination with a vehicle frame, of a steerable road wheel, a steering knuckle carrying said road wheel, a king pin supporting said knuckle for steering movement, a link pivotally connected to said frame and to said knuckle on substantially horizontal axes, an element pivoted to said frame above said king pin and having a sliding connection with the latter, and means acting through said element for swinging said knuckle on said king pin, said link occupying normally a substantially horizontal position and said king pin being disposed substantially vertically.

8. In an independent wheel suspension for motor vehicles, the combination with a vehicle frame, of a steerable road wheel, and means supporting said road wheel on said frame for steering and for rising and falling movements, said means comprising a pair of links, each of said links being pivotally connected to the other link and to the frame, one of said links being disposed substantially vertically and comprising relatively movable, telescoping members, and means mounting said wheel on said last named link for rotative steering movement.

9. In a motor vehicle, the combination with a vehicle frame, of a steerable road wheel, an elongated member supporting said wheel for rotative movement with respect thereto, a pivotal and sliding connection between said member and said frame, a link pivotally connected to said frame and to said member, and steering mechanism associated with said wheel for effecting rotation thereof with respect to said member, said mechanism including a steering arm associated with and acting through said sliding connection.

10. In an independent wheel suspension for motor vehicles, the combination with a vehicle frame, of a steerable road wheel, and means supporting said road wheel on said frame for steering and for rising and falling movements, said means comprising a pair of links, each of said links being pivotally connected to the other link and to the frame, one of said links being disposed substantially vertically and comprising relatively movable, telescoping members, the other of said links being normally disposed substantially horizontally, and means mounting said wheel on said last named link for rotative steering movement.

11. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, means affording a laterally swinging and vertically slidable connection between said king pin and said frame, and means associated with said knuckle and acting through said sliding connection for imparting steering movement to said knuckle.

12. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, means affording a laterally swinging and vertically slidable connection between said king pin and said frame, means associated with said knuckle for imparting steering movement thereto, and a leaf spring acting between said frame and said link to resist upward movement of the latter.

13. In a motor vehicle, the combination with a vehicle frame, of a steerable road wheel assembly, a member supporting said wheel assembly for rotative steering movement, a link pivotally connected to said frame and to said member for swinging movement in a substantially vertical plane, means pivotally connected with said frame and having a sliding connection with said member for guiding the latter in a predetermined path as the road wheel rises and falls, and mechanism associated with said wheel assembly and acting through said means to effect steering movement of said road wheel assembly, the points of pivotal connection for said link being so disposed that the link approaches a position perpendicular to the path of relative sliding movement of said means and said member as the wheel assembly rises.

14. In a motor vehicle, the combination with a vehicle frame, of a steerable road wheel assembly, a link extending laterally of said frame and pivoted to the latter about a substantially horizontal axis, a member extending upwardly and inclined inwardly of the frame, said road wheel assembly being supported on said member for rotative steering movement with respect thereto, a pivotal connection between said link and said member on a substantially horizontal axis, a connection between said member and said frame permitting both bodily upward and laterally swinging movement of said member, and steering mechanism operating through said last named connection to effect steering movement of said road wheel.

15. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, an element pivoted to said frame above said king pin and having a sliding connection with the latter, a non-rotative connection between said element and said steering knuckle, and means for rotating said element.

16. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, an element pivoted to said frame above said king pin and having a sliding connection with the latter, a non-rotative connection between said element and said steering knuckle, and means for rotating said element, said non-rotative connection comprising a pair of links pivoted to each other and to said element and knuckle respectively on axes disposed transversely of said king pin.

17. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, an element pivoted to said frame above said king pin and having a sliding connection with the latter, a non-rotative connection between said element and said steering knuckle comprising links pivoted respectively to said element and to said knuckle and pivoted to each other, and means for rotating said element.

18. In a motor vehicle, the combination with a vehicle frame, of a steerable road wheel, a steering knuckle carrying said road wheel, a king pin supporting said knuckle for steering movement, a link pivotally connected to said frame and to said king pin on substantially horizontal axes, means affording a laterally swinging and vertically slidable connection between said king pin and said frame, means associated with said knuckle for imparting steering movement thereto, and a leaf spring acting between said frame and said link to resist upward movement of the latter, said leaf spring being connected with said frame through rubber for damping vibrations induced in the wheel.

FRANK C. BEST.